Jan. 13, 1931. W. SIPES 1,789,161
LAWN MOWER
Filed Nov. 3, 1926 2 Sheets-Sheet 1
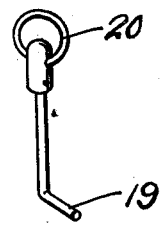
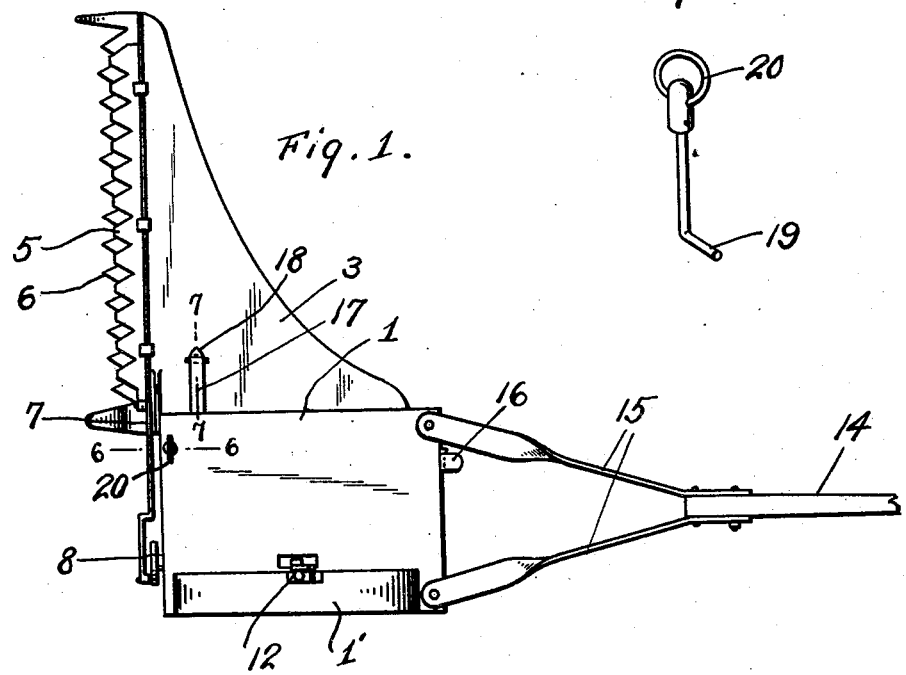
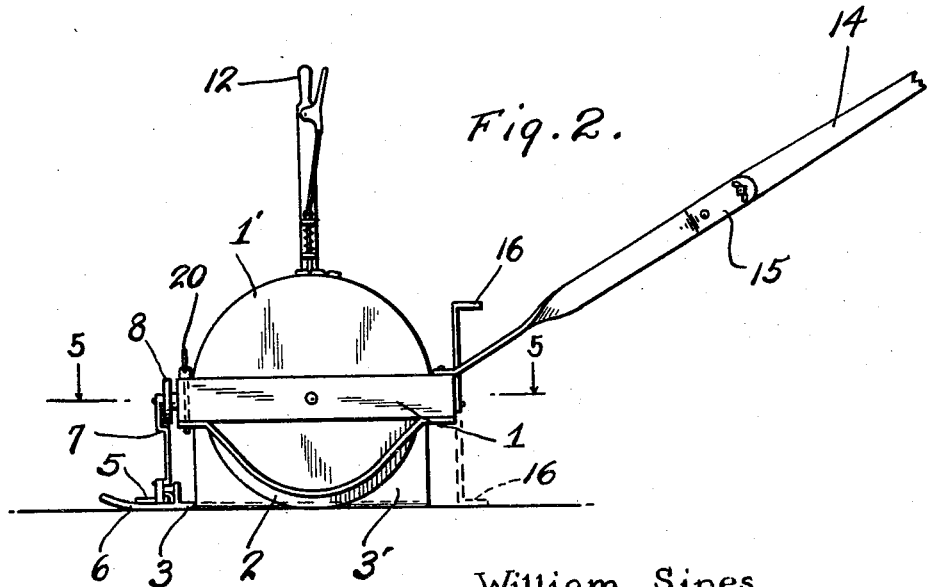

Jan. 13, 1931.   W. SIPES   1,789,161
LAWN MOWER
Filed Nov. 3, 1926   2 Sheets-Sheet 2
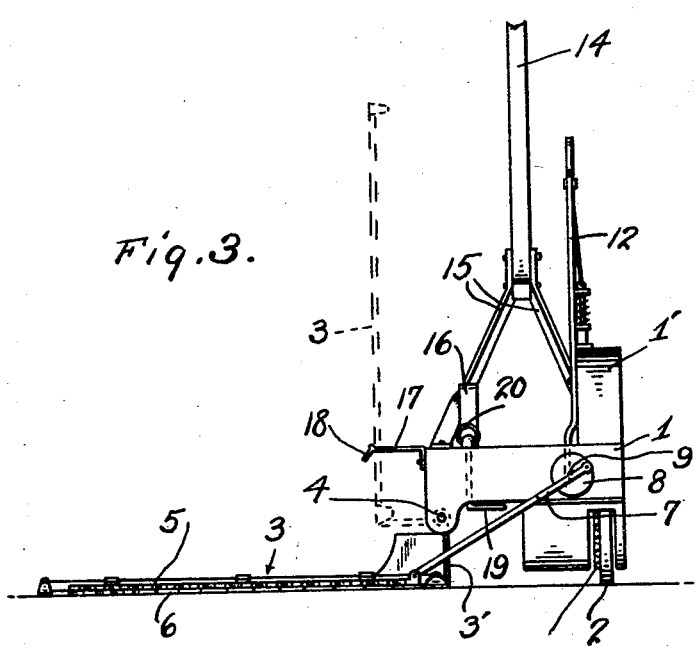
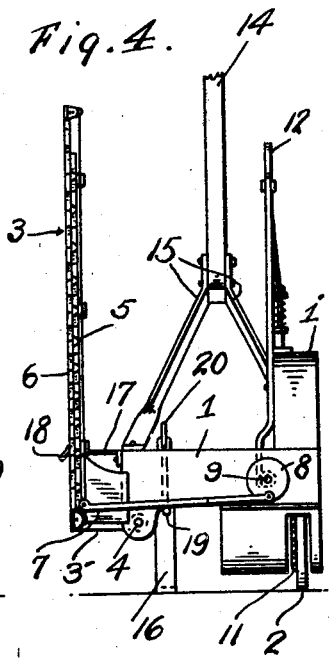
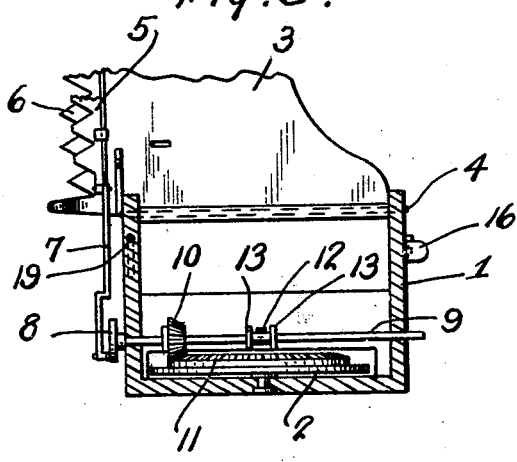
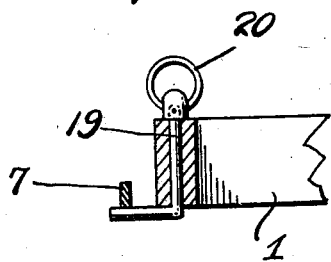
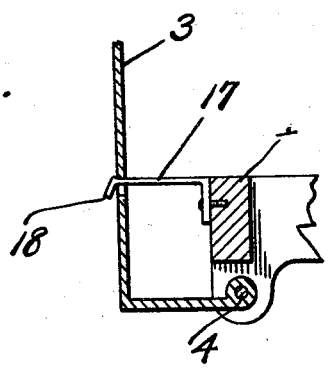
William Sipes
INVENTOR
BY *Victor J. Evans*
ATTORNEY
WITNESS:

Patented Jan. 13, 1931

1,789,161

UNITED STATES PATENT OFFICE

WILLIAM SIPES, OF SHELBYVILLE, INDIANA

LAWN MOWER

Application filed November 3, 1926. Serial No. 146,025.

This invention relates to a lawn mower, the general object of the invention being to provide the mower with a reciprocating knife so that it can cut long grass as well as short grass, with means for reciprocating the knife through means operable from one of the ground wheels.

Another object of the invention is to so construct the device that it can be manufactured to sell at low cost and one which can be kept in condition with but the use of a few tools.

Another object of the invention is to provide means for holding the cutting means in upright position at one side of the machine.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:

Figure 1 is a plan view of the device.

Figure 2 is a side view thereof.

Figure 3 is a front view.

Figure 4 is a front view with the cutting means in raised position.

Figure 5 is a section on line 5—5 of Figure 2.

Figure 6 is a section on line 6—6 of Figure 1.

Figure 7 is a section on line 7—7 of Figure 1.

Figure 8 is a view of the holder for the pitman.

In these views, 1 indicates the housing of the machine which includes a vertical part 1' at one side thereof which encloses the major portion of the ground wheel 2, the lower portion of the wheel being exposed so that it can engage the ground and hold the part 1' a slight distance above the ground. I prefer to roughen the tread of the wheel so that it will not slip on the surface over which the device is passing. A toothed bar 3 has a vertical part 3' which has its upper end hingedly connected with the lower part of the casing at the side opposite that which carries the ground wheel, as shown at 4, so that the toothed bar can be swung into vertical position, as shown in dotted lines in Figure 3 and in full lines in Figure 4.

The front edge of the toothed bar is provided with the usual spaced cutting teeth 5 with which cooperate the cutting teeth of the cutter bar 6 which is slidably mounted on the front part of the toothed bar. A pitman 7 connects the cutter bar with a crank pin of a crank disk 8 which is fastened to the outer end of a shaft 9 which is journaled in the housing and has a pinion gear 10 thereon which meshes with the ring gear 11 on the inner face of the ground wheel 2. Thus the cutter bar will be reciprocated from the ground wheel. A hand lever 12 is pivoted in the housing and has its lower end engaging the space formed by a pair of collars 13 on the shaft 9 so that by manipulating this lever, the shaft can be moved longitudinally to place the gear 10 into engagement with the gear 11 or out of engagement with the said gear. A handle 14 is connected with the housing by means of the diverging straps 15 and an L-shaped member 16 is pivoted to the rear part of the housing adjacent the toothed bar side thereof so that this member can be swung downwardly to form a rest for this side of the housing when the toothed bar is moved upwardly when this member 16 will take the place of the toothed bar in supporting the device in horizontal position.

The toothed bar is held in raised position by means of the spring latch 17 connected with the housing and engaging a slot 18 formed in the toothed bar. An L-shaped member 19 is rotatably supported in the front part of the housing and has a handle 20 at its upper end whereby it can be turned to place its horizontal arm under the pitman to prevent said pitman and the cutter bar from dropping when the toothed bar is in raised position.

From the foregoing it will be seen that when the toothed bar is in horizontal position, it will slide on the ground so that it will act as a runner and support one side of the housing while the wheel is supporting the other side. The rotary movement of the wheel is transmitted to the cutter bar to reciprocate the same through means of the pitman and the shaft 9 so that the cutter bar will be reciprocated as the machine is pushed or pulled along. The device will cut grass of any length and when the toothed bar is swung upwardly the device can be moved along and passed through narrow gates and the like without difficulty.

As will be seen, the device has but comparatively few parts and it can be kept in repair with but the use of a few tools.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. A lawn mower comprising a housing, a ground wheel at one side thereof, a toothed bar including a vertical portion hingedly connected with one side of the housing, whereby said bar can be arranged horizontally for use or vertically when not in use, a cutter bar slidably mounted on said toothed bar, means for reciprocating said cutter bar from the ground wheel, including a pitman, said toothed bar having a slot, a resilient latch element projecting from the housing and arranged to be received by said slot when the bar is swung to a vertical position, and a member rotatably supported on the housing and adapted to be arranged beneath the pitman to assist the latch in supporting the bar in vertical position.

2. A lawn mower comprising a housing, a ground wheel at one side thereof, a toothed bar including a vertical portion hingedly connected with one side of the housing, whereby said bar can be arranged horizontally for use or vertically when not in use, a cutter bar slidably mounted upon the toothed bar, means for reciprocating said cutter bar from the ground wheel, including a pitman, said toothed bar having a slot therein, a resilient latch projecting horizontally from the housing and adapted to be received by the slot when said bar is swung to its vertical position, a substantially L-shaped supporting element rotatably supported on the housing and having its horizontal branch arranged to engage and support the pitman in its vertical position.

In testimony whereof I affix my signature.

WILLIAM SIPES.